United States Patent [19]

Barkhoudarian

[11] 4,416,161

[45] Nov. 22, 1983

[54] METHOD AND APPARATUS FOR MEASURING TORQUE

[75] Inventor: Sarkis Barkhoudarian, Canoga Park, Calif.

[73] Assignee: Rockwell International Corporation, El Segundo, Calif.

[21] Appl. No.: 301,683

[22] Filed: Sep. 14, 1981

[51] Int. Cl.³ .............................................. G01L 3/10
[52] U.S. Cl. ............................ 73/862.36; 73/862.28; 324/209
[58] Field of Search ......... 73/DIG. 2, 862.28, 862.36, 73/862.69, 779, 862.33; 324/209; 336/20, 30

[56] References Cited

U.S. PATENT DOCUMENTS

| | | | |
|---|---|---|---|
| 2,511,178 | 6/1950 | Roters | 73/862.36 |
| 2,566,566 | 9/1951 | Howes | 73/862.33 |
| 3,427,872 | 2/1969 | Leep et al. | 73/DIG. 2 |
| 3,783,370 | 1/1974 | Birdwell et al. | 73/765 X |
| 3,861,206 | 1/1975 | Kawafune et al. | 73/862.36 X |
| 4,106,334 | 8/1978 | Studtmann | 73/862.28 |

FOREIGN PATENT DOCUMENTS 1900194 7/1970 Fed. Rep. of Germany ... 73/862.36
147580 4/1981 German Democratic Rep. .................................... 324/209

Primary Examiner—Charles A. Ruehl
Attorney, Agent, or Firm—H. Fredrick Hamann; Harry B. Field

[57] ABSTRACT

A magnetic field is generated in the vicinity of a rotatably driven, loaded shaft. A Wiegand device in the shaft is differentially displaced by twisting of the shaft. Changes in magnetization in the regions during rotation of the shaft are detected by a coil. The characteristics of the pulses generated by the coil are representative of the twisting of the shaft and accordingly the torque transmitted thereby. A first signal is derived, which is representative of a characteristic of the generated pulses and a second signal is derived, which is representative of the period of the changes in magnetization. Power is represented by the quotient of the first signal divided by the second signal.

34 Claims, 11 Drawing Figures

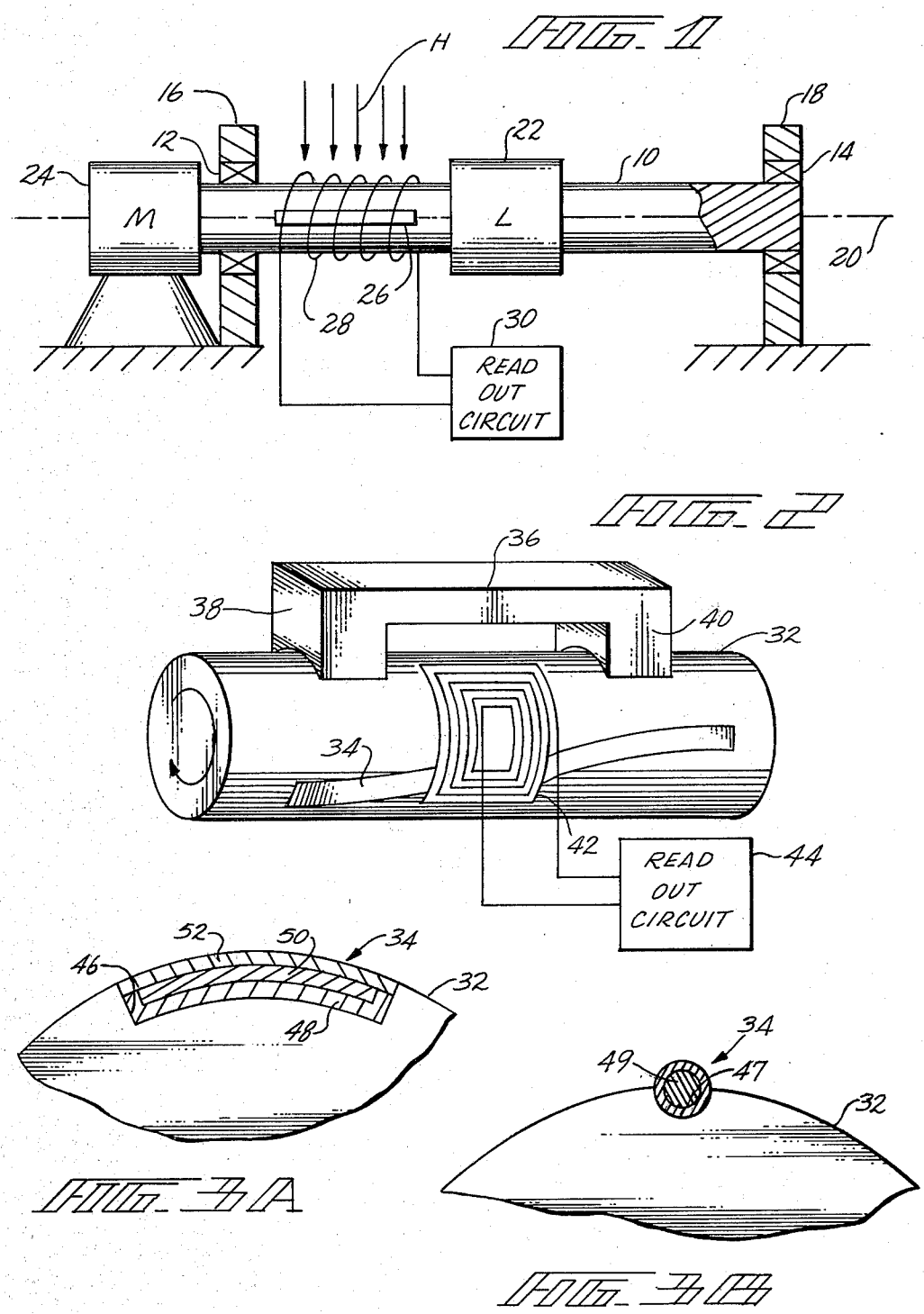

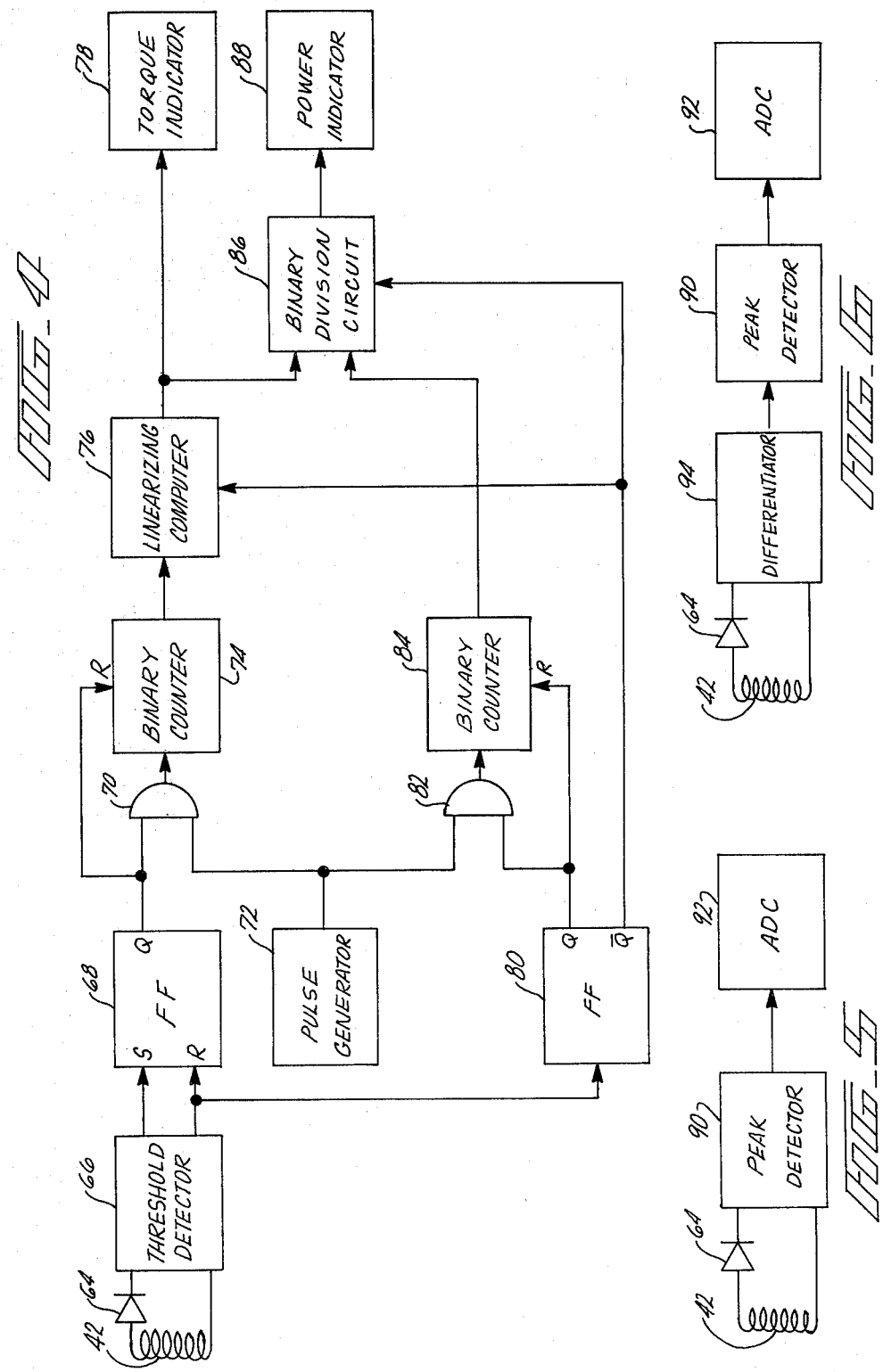

METHOD AND APPARATUS FOR MEASURING TORQUE

BACKGROUND OF THE INVENTION

This invention relates to the measurement art and, more particularly, to a method and apparatus for measuring the torque and/or horsepower transmitted by a loaded rotating shaft, and also rotary shaft speed.

One common technique for measuring the torque transmitted by a loaded rotating shaft is to cement a strain gage to the surface of the shaft. The strain gage is deformed by twisting of the shaft, which is proportional to the torque exerted on the shaft by the prime mover. The low amplitude output signal from such a strain gage exhibits erratic drift over a period of time due to creep of the cement.

Further, if the strain gage is excited by direct current, slip rings and brushes, which wear with prolonged use, are needed to couple the electrical source and readout to the strain gage, and if the strain gage is excited by alternating current, a transformer is needed to couple the electrical source and readout to the strain gage.

Another technique for measuring the torque transmitted by a loaded rotating shaft employs a torsional variable differential transformer. Although this technique does not use a strain gage on the shaft or slip rings or brushes, it does require a well regulated alternating current excitation source and four balanced pickup coils to detect the change in magnetic permeability of the shaft due to torsional stress therein.

None of the above-described torque meters generates speed information; thus they require an additional sensor, such as a magnetic pickup device, to determine rotary speed (RPM) information for measurement of horsepower. Further, all of the above torgue meters employ analog signal processing and are bulky, thus unbalancing the power shaft and causing excessive bearing wear.

SUMMARY OF THE INVENTION

The invention utilizes an avalanche Barkhausen effect and magnetostriction to measure the torque transmitted by a loaded rotating shaft. This technique does not require cementing a strain gage to the shaft, a source of electrical excitation, or wearing contact with the shaft, and permits convenient derivation of a horsepower and or rotary speed value from a single pulse readout signal.

One aspect of the invention is a method for measuring the torque transmitted by a rotatably driven shaft to a load. A magnetic field is generated in the vicinity of the shaft. An elongated boundary between ferromagnetic regions having different coercivity is formed on the shaft such that the boundary extends along the axis of the shaft and is differentially displaced by twisting of the shaft. Changes in magnetization in the regions during rotation of the shaft are detected. The characteristics of such changes in magnetization are representative of the twisting of the shaft, and accordingly the torque transmitted thereby.

Another aspect of the invention is a power transmission system in which a shaft is supported for rotation about a central axis, a load is mounted on the shaft, and a motor is coupled to the shaft to drive the load. A magnetic field generator is disposed in the vicinity of the shaft between the motor and the load. The shaft has a zone in which a ferromagnetic material having low coercivity is disposed adjacent to a ferromagnetic material having high coercivity so as to exhibit the Wiegand effect. The zone is differentially displaced as a function of twisting displacement of the shaft. A sensor detects changes in magnetization of the zone.

A feature of the invention is the derivation of a power representative signal from the foregoing changes in magnetization. A first signal is derived, which is representative of a characteristic of the changes in magnetization, and a second signal is derived, which is representative of the period of the changes in magnetization. Power is represented by the quotient of the first signal divided by the second signal.

The characteristics of pulses derived from the described changes in magnetization are not appreciably affected by the speed of shaft rotation and thus their detection can be used as an accurate measure of torque. Further, the invention permits the convenient derivation of a horsepower representative signal from a single readout signal. Since the ferromagnetic regions can be formed on the shaft without cement if desired, erratic drift over a period of time can be avoided. Further, no contact with the shaft or electrical excitation source is required to produce the changes in magnetization.

BRIEF DESCRIPTION OF THE DRAWINGS

The features of specific embodiments of the best mode contemplated of carrying out the invention illustrated in the drawings, in which:

FIG. 1 is a schematic diagram of a power transmission system illustrating one embodiment of the invention;

FIG. 2 is a schematic diagram of part of a power transmission system illustrating another embodiment of the invention;

FIGS. 3A and 3B are enlargements of part of the shaft in FIG. 1 or FIG. 2 showing different versions of a zone for generating torque representative pulses;

FIG. 5 is a schematic block diagram of another embodiment of the readout circuit of FIG. 1 or FIG. 2;

FIG. 6 is a schematic block diagram of still another embodiment of the readout circuit of FIG. 1 or FIG. 2;

FIG. 9 is a schematic diagram of a shaft having multiple zones for generating torque representative pulses.

DETAILED DESCRIPTION OF THE SPECIFIC EMBODIMENTS

Figure 7:
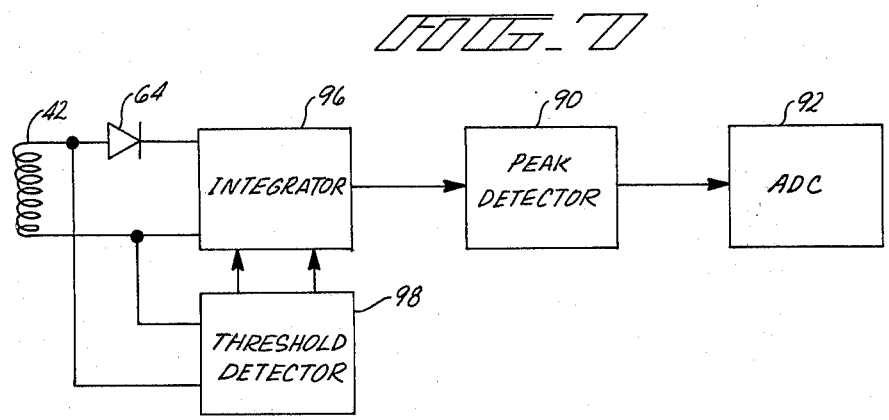
FIG. 7 is a schematic block diagram of yet another embodiment of the readout circuit of FIG. 1 or FIG. 2.

In FIG. 1, a shaft 10 is journaled by bearings 12 and 14 for rotation in stationary support members 16 and 18, respectively, about a central axis 20. A load 22 which could be any mass to be rotatably driven, such as, for example, a pump impeller, is fixedly mounted on shaft 10. A rotary prime mover 24 such as a motor or engine is coupled to shaft 10 to rotatably drive load 22. As described in more detail below, an elongated zone 26 having a ferromagnetic region with high coercivity surrounding a ferromagnetic region with low coercivity is formed on shaft 10 between load 22 and motor 24. Both ferromagnetic regions preferably exhibit magnetostrictive properties. In a typical embodiment zone 26 has a length 5 to 10 times its width; and its width is a small fraction of the shaft circumference, e.g., 5° to 20°. Preferably zone 26 is aligned with, i.e., parallel to, axis 20 when shaft 10 is torsionally unstressed. As illustrated in FIG. 1, a static, i.e., unvarying, magnetic field H is generated in the vicinity of zone 26 by a permanent magnet such as Alnico or a rare earth metal alloy.

In the embodiment shown, magnetic field H is oriented to impinge upon the surface of shaft 10 in a direction transverse to axis 20. Other orientations are also operative and sometimes preferred. A helical pickup coil 28 is wrapped around shaft 10 in the vicinity of zone 26. As used herein the term "helical coil" refers to a coil in which each turn has the same perimeter and is spaced axially from an adjacent turn. Zone 26 is adapted to exhibit an avalanche Barkhausen effect when exposed to a varying magnetic field such as is produced by rotation of shaft 10 in static magnetic field H. As a result, a pair of pulses of opposite polarity are generated by pickup coil 28 during each rotation of shaft 10 due to sudden changes in magnetization of zone 26.

When torque is transmitted by shaft 10 from motor 24 to load 22, shaft 10 is torsionally stressed and shaft 10 twists an amount proportional to the transmitted torque. When shaft 10 twists, zone 26 is differentially displaced angularly, i.e., one portion of the length of zone 26 is angularly displaced a different amount from every other portion thereof. It has been discovered that the differential angular displacement of zone 26 caused by twisting of shaft 10 changes the characteristics of the readout pulses generated by pickup coil 28. Coil 28 is coupled to a readout circuit 30 which senses the changes in one or more readout pulse characteristics. These changes in pulse characteristics are representative of the twisting of shaft 10 and, therefore, the torque transmitted thereby. The quotient of the torque transmitted by shaft 10 divided by the period of rotation of shaft 10, which is represented by the period of the pulses generated by pickup coil 28, represents the horsepower transmitted by shaft 10 from motor 24 to load 22. Accordingly, readout circuit 30, a number of embodiments of which are described below, can produce a signal representative of torque and/or horsepower.

In FIG. 2, part of a power transmission system is shown depicting a particular magnetic field generator and a different pickup coil arrangement. The left end of a rotatable shaft 32, as viewed in FIG. 2, is driven by a motor (not shown). A load (not shown) is mounted on the right side of shaft 32. An elongated zone 34 having a ferromagnetic region with high coercivity surrounding a ferromagnetic region with low coercivity is formed on the surface of shaft 32. Preferably, both ferromagnetic regions are magnetostrictive. When shaft 32 is torsionally unstressed, zone 34 lies on a straight line parallel to the axis of rotation of shaft 32. But when shaft 32 is torsionally stressed, as occurs when it is loaded and rotationally driven, zone 34 becomes differentially angularly displaced as depicted in FIG. 2, the portions of zone 34 closer to the motor being angularly displaced from the motor less than the portions of zone 34 nearer the load. The magnetic field is generated by a U-shaped permanent magnet having poles 38 and 40 at its ends. Poles 38 and 40 are aligned with the axis of rotation of shaft 32 and closely spaced from the surface thereof so that the magnetic field is oriented in a direction approximately parallel to the axis of rotation of shaft 32 at the surface thereof. Alternatively, the permanent magnet could be cylindrical. Although the preferred orientation for the magnetic field is usually as shown in FIG. 2, other magnetic field orientations may also provide the desired change in pulse characteristics as a function of torque transmission. For example, a U-shaped magnet having poles perpendicular to axis of shaft rotation could be employed. A spiral pickup coil 42 is coupled to a readout circuit 44. Coil 42 is curved to conform to the surface of shaft 32 and is closely spaced therefrom to maximize the inductive coupling of changes in magnetic field of zone 34 thereto. As used herein, the term "spiral coil" refers to a coil in which each turn has a larger perimeter than and surrounds an adjacent turn so that all the turns lie in the same plane.

Pickup coil 28 of FIG. 1 provides a larger signal than pickup coil 42 in FIG. 2 but the invention can be implemented by retrofitting an already installed power transmission system with pickup coil 42 without disassembling the shaft or other components of the system. Yet other arrangements of pickup coils could be employed. It is not believed that the orientation of the pickup coil relative to the interface is critical, although such orientation does effect the signal strength, as discussed above.

In FIGS. 3A and 3B, enlargements of parts of shaft 32 are depicted to illustrate the preferred embodiments of zone 34. In FIG. 3A, an axially elongated groove 46 is formed in the surface of shaft 32 by milling, etching or other similar technique. A layer of ferromagnetic material 48 such as Permalloy (50% nickel and 50% iron) or Vicalloy (10% Vanadium, 52% cobalt, and 38% iron) having a coercivity of a few hundred oersteds, is then deposited on the shaft 32 to cover the entire floor and sides and ends of groove 46. Thereafter, an elongated layer 50 of ferromagnetic material such as a variant of Permalloy or Vicalloy having a coercivity of a few dozen oersteds is deposited on layer 48. Layer 50 is slightly smaller in area than layer 48 and spaced from the sides and ends of groove 46 by layer 48. Finally, a layer 52 of ferromagnetic material having high coercivity, preferably the same material as layer 48, is deposited on layer 50 and the portions of layer 48 surrounding it at the sides and ends of grooves 46. If desired, the outer surface of layer 52 could be ground down to be flush with the surface of shaft 32. The ferromagnetic zone thus formed is an elongated, thin, substantially flat ribbon comprising a core having relatively large mass and low coercivity completely covered by an outer skin having relatively small mass and high coercivity. Instead of being recessed in a groove, the ribbon could be formed directly on the surface of shaft 32 so as to protrude slightly therefrom. In general, this would not adversely effect the rotational balance of shaft 32 because layers 48, 50, and 52 are of the order of a fraction of a millimeter in thickness, although layer 50 is preferably thicker than layers 48 and 52. Layers 48, 50, and 52 could be deposited by any one of a number of known techniques such as vacuum deposition, sputtering, or electroplating, or painting.

In FIG. 3B, an axially elongated semicylindrical groove 47 is formed in the surface of shaft 32 by milling or similar technique. Zone 34 comprises an elongated wire inserted in groove 47 and secured therein by cement, welding, or some other means. The wire, a so-called "Wiegand wire," comprises in a ferromagnetic material a cylindrical core 49 having relatively large mass and low coercivity completely covered by an annular outer skin having relatively small mass and high coercivity. By way of example, the wire could be made from Permalloy (50% nickel and 50% iron) or Vicalloy (10% Vanadium, 52% cobalt, and 38% iron). The core of this wire would have a coercivity of about 5 oersteds. To form the outer skin, the wire could be work-hardened by twisting to produce therein a coercivity of between 20 and 40 oersteds.

As between the versions of FIGS. 3A and 3B, it is believed that the version of FIG. 3A is preferred because the cross section of the zone in that version should provide greater displacement of the magnetic domains in the zone for a given twist and therefore greater sensitivity to applied torque.

In general, the invention is believed to be operable with any type of magnetic zone that exhibits an avalanche Barkhausen effect in a varying magnetic field and magnetistrictive properties. It has been known for many years that the magnetization of a ferromagnetic material changes, in small discrete rather than continuously, as a function of magnetic field; this phenomenon is known as the Barkhausen effect. Recently, it has been discovered that it is possible to amplify, so to speak, the Barkhausen effect, thereby creating large abrupt changes in magnetization, which is referred to herein as an avalanche Barkhausen effect. An example of such an avalanche Barkhausen effect is described, for example, in an article entitled "Wiegand Wire: New Material for Magnetic-Devices", which appeared in ELECTRONICS MAGAZINE, July 10, 1975, on pages 100–105. The magnetic zone could be formed by other material treating techniques such as peening, work-hardening, surface-hardening, etc., or a suitable structure could be bonded, painted and then sintered, or welded on the surface of the shaft if creeping of the cement is not a concern or can be prevented. It may be possible to employ the shaft itself as one of the ferromagnetic materials and to form by work-hardening, or other means, a single ribbon of another ferromagnetic material in axial alignment with the shaft, rather than completely surrounding the ferromagnetic material having low coercivity with the ferromagnetic material having high coercivity.

Figure 8A:
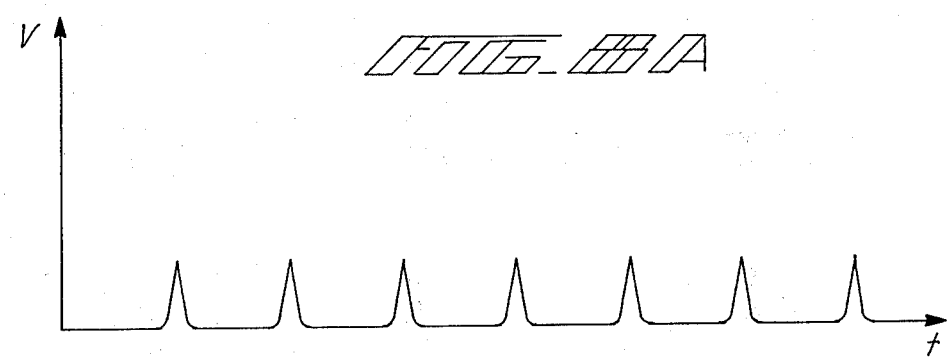
FIG. 8A is a diagram depicting the output signal from the pickup coil in FIG. 1 or FIG. 2.

FIG. 8A represents readout pulses of one polarity generated by the readout coil (28 or 42) during a certain period of time. On the assumption that the pulses of the other polarity are removed by rectification, they are not represented in FIG. 8A. The period of the pulses in FIG. 8A is representative of the reciprocal of the frequency of rotation of the shaft (32 or 10). Although a single zone is depicted on the shafts in FIGS. 1 and 2, a plurality of such zones could be formed on each shaft, which would produce a plurality of pulses during each revolution of the shaft. In such case, the period of the pulses would be representative of the reciprocal of a multiple of the frequency of rotation of the shaft.

Figure 8B:
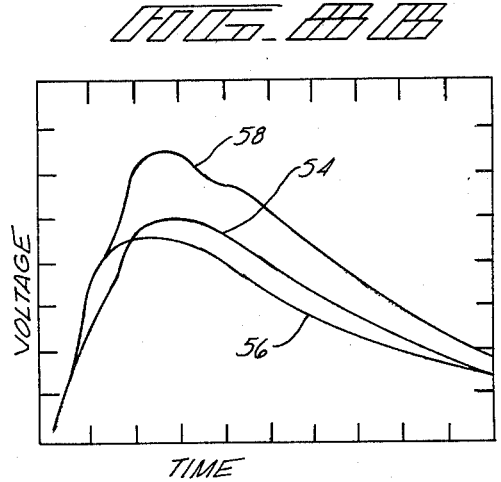
FIG. 8B is an enlargement of one of the pulses in FIG. 8A for different conditions of torsional shaft stress.

FIG. 8B shows waveforms representing one of the readout pulses of FIG. 8A corresponding to different degrees of twisting of the shaft in a greatly expanded time scale. Waveform 54 represents a pulse generated by the pickup coil when the shaft is torsionally unstressed, i.e., untwisted. Waveform 56 represents a pulse generated by the pickup coil when the shaft is torsionally stressed, i.e., twisted, to its maximum allowable extent in one direction, and waveform 58 represents a pulse generated by the pickup coil when the shaft is torsionally stressed, i.e., twisted, to the maximum allowable extent in the other direction. In a typical example, the maximum extent of twist was 50° per foot of shaft, the horizontal time graduations were 20 microseconds, and the vertical amplitude graduations were 50 millivolts. It can be seen from the waveforms in FIG. 8B that there is a substantial difference in characteristics of the pulses under differing torsional stress. For example, the pulse width varies by as much as about 20 microseconds between a torsionally unstressed condition and the maximum allowable torsional stress. The maximum amplitude of the pulses varies by as much as about 75 millivolts between a torsionally unstressed condition and the maximum allowable torsional stress. Similarly, the integral of the pulses and the derivative of the pulses also vary between the torsionally unstressed condition and the maximum alowable torsional stress. Readout circuits 30 and 44 sense the difference in one or more of the pulse characteristics between a torsionally unstressed condition and a torsionally stressed condition to derive a signal representative of the torque transmitted by the shaft. In general, reference data must first be generated by measuring the pulse characteristics for a torsionally unstressed shaft and for a number of different known values of applied torque. During meaurements of unknown shaft torque transmission, the detected values of the pulse characteristics are compared with the reference data to derive a signal representative of the transmitted shaft torque.

The operability of the invention has been verified by the following experimental setup. A stationary hollow Plexiglass tube one foot long with an outer diameter of $\frac{3}{4}$ inch and a wall thickness of $\frac{1}{8}$ inch was fixed at one end by clamping. A pickup coil was wound around a straight Wiegand wire. The Wiegand wire and coil were bonded to the surface of the tube with epoxy parallel to the tube axis. A permanent bar magnet was affixed to the periphery of a disk that was roatatably driven about an axis parallel to the axis of the stationary tube so that the permanent magnet repeatedly approached and moved away from the Wiegand wire as the disk rotated. The north and south poles of the permanent magnet were oriented so a straight line therebetween was parallel to the axis of rotation of the disk. The wave forms of FIG. 8B represent the readings obtained in the experimental setup, each horizontal time graduation corresponding to 20 microseconds and each vertical voltage graduation corresponding to 50 millivolts. When no torque was applied to the stationary tube, wave form 54 was produced. When torque was applied to the unclamped end of the stationary tube to twist it 10 degrees in one direction, wave form 56 was produced. When torque was applied to the unclamped end of the stationary tube to twist it 10 degrees in the opposite direction, wave form 58 was produced. Thus, a variation in pulse width of about ±20 microseconds was obtained and a variation in pulse amplitude of about 100 millivolts was obtained.

Of course it is the avalanche Barkhausen effect that causes abrupt changes, i.e., switching, in the magnetization of the elongated zone (26 or 34) on the shaft. It is believed that the changes in the characteristics of the electrical pulses generated in response to the switching in magnetization are due to magnetostriction; as the zone twists with the shaft, its magnetic properties, specifically reluctance, change, which correspondingly effects the characteristics of the pulses generated by the pickup coil. Thus the ferromagnetic materials comprising the elongated zone on the shaft preferably exhibit strong magnetostrictive properties, thereby presumably enhancing the sensitivity of the measurement.

Figure 4:
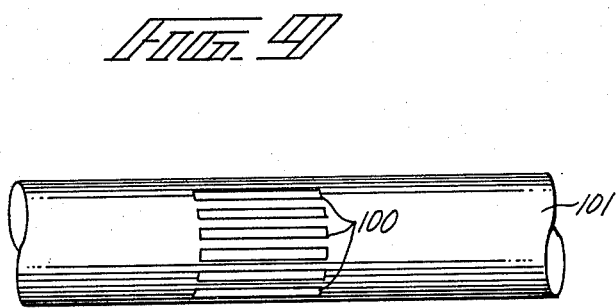
FIG. 4 is a schematic block diagram of one embodiment of the readout circuit of FIG. 1 or FIG. 2.

The readout circuit of FIG. 4 detects changes in width of the pulses generated by the pickup coil and derives therefrom signals representative of torque and horsepower. Specifically, pickup coil 42 (or pickup coil 28) is coupled by a rectifier 64 to a threshold detector 66. Threshold detector 66 has two outputs connected, respectively, to the set and reset inputs of a flip flop 68. When the level of the positive pulse generated by pickup coil 42 exceeds a low threshold amplitude set to reject noise, a trigger pulse is generated on one output of threshold detector 66 to set flip flop 68. When the detected pulse drops back below the threshold value, a trigger pulse is generated on the other output of threshold detector 66 to reset flip flop 68. The Q output of flip flop 68 is connected to one input of an AND gate 70. The Q output of flip flop 68 is also directly connected to the reset input of binary counter 74. A pulse generator operating at a high frequency, i.e., 10 megahertz or more, is connected to the other input of AND gate 70. The output of AND gate 70 is connected to the state changing input of a binary counter 74. When flip flop 68 is set, the Q output because high, thereby resetting counter 74 and enabling AND gate 70 to transmit to counter 74 pulses from generator 72. When flip flop 68 is reset, the Q output becomes low, thereby disabling AND gate 70 and terminating transmission of pulses from generator 72 to counter 74. The state of counter 74 therefore represents in binary code the width of each detected pulse in turn. Binary counter 74 is coupled by a linearizing computer 76 to a digital torque indicator 78. A table corresponding to the reference data is stored in computer 76. Thus, the binary coded signal from counter 74 is converted to another binary coded signal that represents for display by indicator 78 the torque transmitted by the shaft in desired units. One output of threshold detector 66 is coupled to a flip flop 80 having complementary Q and Q outputs. Each time a detected pulse drops below the threshold of detector 66, a trigger pulse is generated for flip flop 80, thereby changing its state. Thus, flip flop 80 functions to divide the frequency of the detected pulses by two. The Q output of flip flop 80 is connected to one input of AND gate 82 and to the reset input of a binary counter 84. Pulse generator 72 is connected to the other input of AND gate 82. When the Q output of flip flop 80 becomes high at the end of one of the detected pulses, counter 84 is reset and gate 82 is enabled to transmit pulses from generator 72 to counter 84. When the Q output of flip flop 80 becomes low once again at the end of the next succeeding detected pulse, AND gate 82 is disabled and no more pulses from generator 72 are transmitted to counter 84. Thus, during the period between the end of alternating detected pulses, the state of binary counter 84 represents in binary code the period of the detected pulses, i.e., the reciprocal of their frequency. Mathematically, horsepower is equal to the product of torque divided by the period of rotation. The outputs of computer 76 and counter 84 are coupled to the dividend and divisor inputs, respectively, of a binary division circuit 86. The Q output of flip flop 80 is connected to a command input of computer 76 and to division circuit 86 so as to initiate their operation. Each time the Q output of flip flop 80 becomes high, counters 74 and 84 stop counting and computer 76 transfers to its output a new value from the table stored therein corresponding to the value at that time stored in counter 74, and division circuit 86 divides the table derived value by the value stored in counter 84. Division circuit 86 is coupled to a digital power indicator 88 on which the horsepower transmitted by the shaft is displayed.

In FIG. 5 the readout circuit detects the amplitude of the pulses generated by the pickup coil. Coil 42 (or coil 28) is coupled by rectifier 64 to a peak detector 90, which generates an analog signal proportional to the peak value of the detected pulse. Peak detector 90 is connected to an analog to digital converter (ADC) 92 to provide a binary coded signal representative of the amplitude of a detected pulse.

In FIG. 6 the readout circuit detects the peak value of the derivative of the pulses generated by the pickup coil. A differentiator 94 is inserted between pickup coil 42 and peak detector 90.

In FIG. 7 the readout circuit detects the integral of the pulses generated by the pickup coil. An integrator 96 is inserted between pickup coil 42 and peak detector 90. Pickup coil 42 is connected to the input of a threshold detector 98, which could be identical to threshold detector 66 in FIG. 4. Threshold detector 98 has two outputs, which are coupled to integrator 96 to start and stop the integration period at the beginning and the end, respectively, of each detected pulse.

In FIGS. 5, 6, and 7, ADC 92 would have a binary counter in which the binary coded signal is stored. This binary counter could be substituted for counter 74 in FIG. 4 to produce with threshold detector 66, computer 76, flip flop 80, binary counter 84, division circuit 86, and indicators 78 and 88, displays of torque and horsepower.

Instead of a single zone on the shaft, as shown in FIGS. 1 and 2, a plurality of zones 100 could be mounted on a shaft 101 as illustrated in FIG. 9. Each of zones 100 is analogous to zone 26 in FIG. 1 or zone 34 in FIG. 2, having a ferromagnetic region with high coercivity surrounding a ferromagnetic region with low coercivity. Regions 100 are preferably flat as depicted in FIG. 3A, and formed in the manner described therein. Shaft 101 is analogous to shaft 10 in FIG. 1, and shaft 32 in FIG. 2, in that a load is mounted thereon and the shaft is driven by a prime mover. A static magnetic field generator and pickup coil (not shown in FIG. 9) are also provided in the manner shown in FIGS. 1 and 2. In the multizone arrangement of FIG. 9 a plurality of readout pulses are produced for each revolution of shaft 101, the number of such pulses per revolution equaling the number of zones 100.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, instead of measuring the torque transmitted by a continuously rotating shaft, the invention could be employed to measure torque transmission of an intermittently rotating or oscillating shaft; but in such case, many different zones would have to be formed around the circumference of the shaft as shown in FIG. 9 to sense the transmitted torque to a reasonable degree of resolution. One of the advantages of the invention is the ease of carrying out the function of the described readout circuit with a microcomputer, the related technology of which has been developed to a high degree of refinement.

What is claimed is:

1. A method for sensing the torque transmitted by a rotatable shaft from a prime mover to a load, the method comprising the steps of:
   generating in the vicinity of the shaft a magnetic field;
   forming on the shaft an elongated boundary between ferromagnetic regions having different coercivity, the boundary extending along the axis of the shaft and being differentially displaced by twisting of the shaft, the forming step forming the boundary in alignment with the axis of the shaft in the absence of torsional stress; and
   detecting changes in magnetization in the regions during rotation of the shaft.

2. The method of claim 1 in which the forming step forms the boundary on the surface of the shaft.

3. The method of claim 1 in which the generating step comprises generating a magnetic field oriented to pass through the ferromagnetic regions approximately parallel to the axis.

4. The method of claim 1 in which the generating step comprises generating a static magnetic field.

5. The method of claim 1 in which the generating step comprises positioning a permanent magnet having north and south poles adjacent to the surface of the shaft such that the north and south poles are aligned with the axis in closely spaced relationship to the surface of the shaft and the boundary between the two ferromagnetic regions lies between the poles.

6. The method of claim 1 in which the detecting step comprises positioning a pickup coil adjacent to and out of contact with the shaft in the vicinity of the boundary and sensing a characteristic of the signal generated by the pickup coil.

7. The method of claim 6 in which the sensing step comprises comparing the characteristic when the shaft is torsionally unstressed with the characteristic when the shaft is torsionally stressed to determine the torque transmitted by the shaft to the load.

8. The method of claim 6 in which the sensing step comprises measuring the width of the signal generated by the pickup coil.

9. The method of claim 6 in which the sensing step comprises measuring the amplitude of the signal generated by the pickup coil.

10. The method of claim 6 in which the sensing step comprises measuring the derivative of the signal generated by the pickup coil.

11. The method of claim 6 in which the sensing step comprises measuring the integral of the signal generated by the pickup coil.

12. The method of claim 6 in which the pickup coil generates pulses occurring at the frequency of rotation of the shaft or a multiple thereof and the sensing step comprises:
   deriving a first quantity representative of a characteristic of the pulses;
   deriving a second quantity representative of the frequency of the pulses; and
   deriving a third quantity representative of the product of the first and second quantities.

13. The method of claim 1 in which the detecting step comprises positioning a helical pickup coil around the shaft in the vicinity of the boundary and sensing a characteristic of the signal generated by the pickup coil.

14. The method of claim 1 in which the detecting step comprises positioning a spiral pickup coil adjacent to the shaft in the vicinity of the boundary and sensing a characteristic of the signal generated by the pickup coil.

15. The method of claim 1, in which the generating step comprises generating a magnetic field lying in a plane perpendicular to the axis.

16. A method for sensing the torque transmitted by a rotatable shaft from a prime mover to a load, the method comprising the steps of:
   generating in the vicinity of the shaft a magnetic field;
   forming on the shaft an elongated boundary between ferromagnetic regions having different coercivity, the boundary extending along the axis of the shaft and being differentially displaced by twisting of the shaft, said forming step comprises securing on the surface of the shaft a thin elongated ribbon of material aligned with the axis of rotation of the shaft when the shaft is torsionally unstressed, the ribbon of material comprising an inner core having low coercivity and an outer skin completely surrounding the core, the outer skin having high coercivity; and
   detecting changes in magnetization in the regions during rotation of the shaft.

17. The method of claim 16 wherein at least a portion of said ribbon of material is magnetostrictive.

18. A method for sensing the torque applied by a rotatably driven shaft to a load, the method comprising the steps of:
   producing a magnetic field in the vicinity of said shaft;
   establishing on said shaft an element that exhibits the avalanche-Barkhausen effect, said element rotating with said shaft and being differentially displaced by twisting of said shaft; and
   measuring the avalanche-Barkhausen effect within said element resulting from the interaction between said magnetic field and said element.

19. The method of claim 18 in which the producing step produces a magnetic field oriented approximately parallel to the axis of rotation of the shaft.

20. The method of claim 19 in which said element is elongated in the direction of the axis of rotation of the shaft.

21. The method of claim 20 additionally comprising the step of comparing the characteristics of the measured avalanche-Barkhausen effect with characteristics of measurements corresponding to known values of shaft twist.

22. The method of claim 21 in which said measuring step comprises positioning a coil in the vicinity of said element and sensing a characteristic of the signal generated by said coil.

23. The method of claim 18 wherein at least a portion of said element is magnetostrictive.

24. In a power transmission system, the combination comprising:
   a shaft having a central axis;
   means for supporting the shaft for rotation about its central axis;
   means for generating a magnetic field in the vicinity of the shaft;
   means for forming on the shaft in the vicinity of the magnetic field an element in which a ferromagnetic material having low coercivity is surrounded by a ferromagnetic material having high coercivity so as to exhibit the avalanche-Barkhausen effect, said element being differentially displaced as a function of twisting displacement of said shaft; and
   means for sensing the avalanche-Barkhausen effect in said element.

25. In a power transmission system, the combination comprising:
- a shaft having a central axis;
- means for supporting the shaft for rotation about its central axis;
- a load mounted on the shaft;
- a motor coupled to the shaft to drive the load;
- means for generating a magnetic field in the vicinity of the shaft between the motor and the load;
- means for forming on the shaft in the vicinity of the magnetic field a zone in which a ferromagnetic material having low coercivity is disposed adjacent to a ferromagnetic material having high coercivity so as to exhibit the Wiegand effect;
- the zone being differentially displaced as a function of twisting displacement of the shaft, the zone being elongated in a direction parallel to the axis of rotation of the shaft; and
- means for sensing changes in magnetization of the zone.

26. The combination of claim 25 in which the sensing means comprises means for generating electrical readout pulses responsive to the changes in magnetization, a first binary counter, a second binary counter, a pulse generator, means for gating pulses from the pulse generator to the first binary counter during a time period representative of a characteristic of a readout pulse, means for gating pulses from the pulse generator to the second binary counter during the interval between successive readout pulses, and means for dividing the count registered in the first counter by the count registered in the second counter to derive a horsepower representative value.

27. The system of claim 26 in which the characteristic is the width of the readout pulse.

28. The combination of claim 25 in which the sensing means comprises means for generating electrical readout pulses responsive to the changes in magnetization and means for detecting the width of the readout pulses.

29. The combination of claim 25 in which the sensing means comprises means for generating electrical readout pulses responsive to the changes in magnetization and means for detecting the amplitude of the readout pulses.

30. The combination of claim 25 in which the sensing means comprises means for generating electrical readout pulses responsive to the changes in magnetization and means for differentiating the readout pulses.

31. The combination of claim 25 in which the sensing means comprises means for generating electrical readout pulses responsive to the changes in magnetization and means for integrating the readout pulses.

32. The combination of claim 25 in which the means for generating a magnetic field comprises a permanent magnet having north and south poles adjacent to the surface of the shaft such that the north and south poles are aligned with the axis of rotation of the shaft in closely spaced relationship to the surface of the shaft and the zone lies at least partially between the poles.

33. The combination of claim 25 in which the forming means comprises an elongated wire attached to the surface of the shaft in alignment with the axis of rotation thereof, the wire having a cylindrical core with low coercivity and an annular outer skin with high coercivity completely covering the core.

34. The combination of claim 25 in which the forming means comprises a flat thin elongated ferromagnetic ribbon secured at the surface of the shaft in alignment with the axis of rotation thereof, the ribbon having an inner core with low coercivity and an outer skin with high coercivity completely covering the core.

* * * * *